ADJUSTABLE HIGH COUNT MAGNETIC COUNTER

Original Filed Feb. 1, 1960 3 Sheets-Sheet 1

INVENTOR
CARL NEITZERT
by: Louis Altman
ATTY.

ADJUSTABLE HIGH COUNT MAGNETIC COUNTER

Original Filed Feb. 1, 1960

INVENTOR
CARL NEITZERT
by: Louis Altman
ATTY.

INVENTOR
CARL NEITZERT by: Louis Altman

ATTY.

United States Patent Office 3,226,562

Patented Dec. 28, 1965

3,226,562
ADJUSTABLE HIGH COUNT MAGNETIC COUNTER

Carl Neitzert, Chatham Township, N.J., assignor to General Time Corporation, New York, N.Y., a corporation of Delaware Original application Feb. 1, 1960, Ser. No. 9,155, now Patent No. 3,156,814, dated Nov. 10, 1964. Divided and this application July 24, 1963, Ser. No. 302,226
10 Claims. (Cl. 307—88)

This is a divisional application of my application Serial Number 9,155, filed February 1, 1960, now Patent No. 3,156,814.

This invention relates to counters and more particularly to adjustable high count counters for use in connection with magnetic logic circuitry. Reference is made to my U.S. Patent 2,897,380 which was granted on July 28, 1959 and is entitled "Magnetic Pulse Counting and Forming Circuit" for a disclosure of some of the features which are shown herein. The above identified patent and the subject invention are assigned to the same assignee.

Counters or sequencing devices which control or direct particular circuit functions responsive to the receipt of a given number of input signals are often employed in timing circuits and in logic circuits. While counters may involve a substantial number of electronic or other components which are coupled to provide counting chains, a much simpler device of fewer components results when the counting is done by magnetic cores having substantially square hysteresis loop characteristics. Moreover, such magnetic cores have inherent advantages since they rely upon the characteristics of core material which are very uniform and stable over a long lifetime. These characteristics may be utilized to provide an extremely wide range of uniform output signals of selected polarity at any rate from 18,000 pulses per second to one pulse per day with an accuracy which varies by less than one-one hundredth of a percent, to provide precise timing, to retain a previous count after power is removed, to count at any speed up to about 100,000 pulses per second, and to withstand extremely high vibration, shock and acceleration forces. Such performance standards are frequently necessary to satisfy the exacting requirements, for example, of remotely-controllable navigational and timing systems, particularly where minimal size and weight are also needed.

However, magnetic counters which have been developed in the past have not adequately exploited these inherent advantages primarily because magnetic cores are driven into saturation responsive to the receipt of a number of pulses which is fixed by the number of turns that are wound about such cores and by the energizing current flow. If it is necessary to provide output signals responsive to a different number of input pulses, it has been necessary either to accept cascaded counters which have large gaps of unobtainable capacity or to provide very complicated subtracter or scaler circuits which require a substantial amount of relatively heavy and expensive equipment. Neither of these alternatives is desirable. Furthermore, added counter circuitry may be unacceptable if it introduces variables detracting from the optimum performance available from magnetic core devices.

Accordingly, it is an object of my invention to provide new and improved counting circuits utilizing the properties of magnetic cores having square hysteresis loop characteristics.

Another object of the invention is to provide saturable core pulse forming and counting stages of increased flexibility and versatility. In this respect, it is an object to form output signals having uniform characteristics responsive to the receipt of any number of input signals. Still another object is to provide such devices in a form which makes them simple and convenient to operate in cascade without undesired reaction or complicated isolation means. Yet another object is to provide counters which combine addition and multiplication processes to provide maximum capacity with a minimum of components.

Other objects and advantages of the invention will appear in the following description taken along with the accompanying drawings in which.

Figure 1:
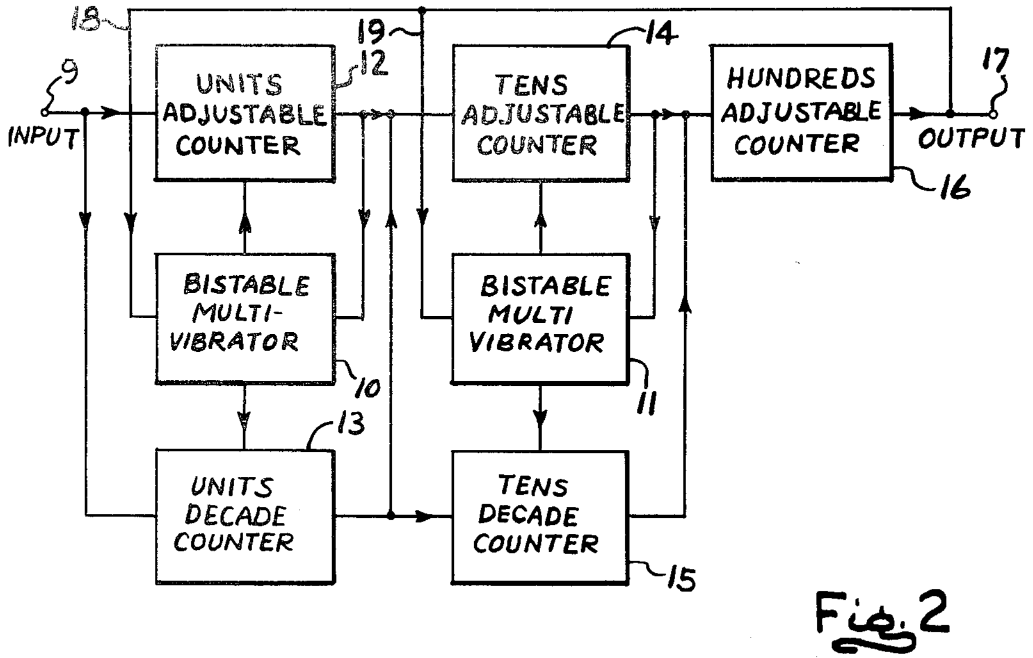
FIGURE 1 is a block diagram showing three stages of magnetic counters connected to provide an adjustable output count.

While the invention is susceptible of various modifications and alternative constructions, there is shown in the drawings and will herein be described in detail certain preferred embodiments. It is to be understood that it is not thereby intended to limit the invention to the particular forms disclosed, but it is on the other hand intended to cover all modifications, equivalents, and alternative constructions falling within the spirit and scope of the invention as expressed in the appended claims.

Turning now to FIGURE 1, principles of the invention are generally illustrated in connection with the block diagram representation of basic component counters each adapted to produce an output pulse after any preselected number of input pulses or signals have been counted. More particularly, any suitable driving source (not shown) applies cyclically recurring pulses of uniform volt-second content to input terminal 9. Two bistable multivibrators or flip-flop steering circuits 10 and 11 are provided to direct input signals to either an adjustable counter or a fixed decade counter depending upon the number of pulses that have been received previously. That is, a specific number of input pulses are counted by units adjustable counter 12 in accordance with a units setting. Then a decade or ten step units counter 13 produces a tens signal each time that ten pulses are received thereafter. In a similar manner, a specific number of tens signals are counted by tens adjustable counter 14 in accordance with a tens setting. Then a decade or ten step counter 15 produces a hundreds signal each time that one hundred input pulses are received thereafter. By adding similar stages, any number of input pulses may be counted. FIG. 1 shows only three stages and therefore it can count any number up to the number 999.

As a specific example of the function of the counter, let it be assumed that the counter of FIG. 1 is adjusted to provide an output pulse after the receipt of "746" input pulses at input terminal 9. That is, a switch associated with units counter 12 is set to indicate the number "6"; a switch associated with tens counter 14 is set to indicate the number "4"; and a switch associated with hundreds counter 16 is set to indicate the number "7." Six input pulses are received at terminal 9, recorded in counter 12, and multivibrator 10 is flipped to its second state so that all input pulses are thereafter directed to units decade counter 13. Additionally, a pulse is transmitted to the adjustable tens counter 14. For each ten additional input pulses received in the units decade counter 13, a pulse is transmitted to the adjustable tens counter 14. The first pulse into the tens stage indicates the receipt of six—rather than ten—input pulses. After ten more input pulses, adjustable tens counter 14 is advanced to indicate the receipt of sixteen input pulses. In a similar manner, tens counter 14 is advanced each time that units decade counter 13 counts ten pulses. On its fifth pulse or step, after the receipt of forty-six input pulses at input terminal 9, counter 14 trips multivibrator 11 and the output of units decade counter 13 is effectively connected to the input of tens decade counter 15. Additionally, a pulse is transmitted to hundreds adjustable counter 16, the pulse representing the receipt of forty-six input pulses. When ten more input pulses are received at terminal 9, counter 13 produces an output pulse and trips tens decade counter 15. Thus, the first pulse that is recorded in counter 15 indicates the receipt of fifty-six input pulses. Every tenth pulse which is received thereafter at input terminal 9 causes units decade counter 13 to pulse tens decade counter 15. After counter 15 has advanced ten steps, it produces an output signal which again drives hundreds counter 16. Thus, the second pulse which is applied to counter 16 occurs after the receipt of one hundred and forty-six input pulses. Thereafter, units decade counter 13 counts every input pulse, tens decade counter 15 counts every tenth pulse, and hundreds adjustable counter 16 counts every hundredth pulse until it reaches its eighth and final step after the receipt of seven hundred and forty-six input pulses.

A single output pulse occurs only after the counter of FIG. 1 receives a predetermined number of input pulses or signals. Responsive thereto, succeeding equipment is energized via terminal 17 and multivibrators 10 and 11 are reset via conductors 18 and 19. The output pulse may also perform whatever further output function is desired.

Figure 3B:
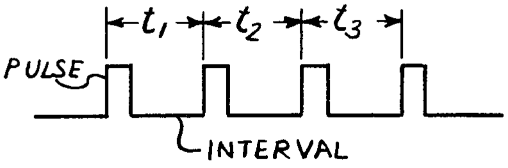
FIG. 3B is a graph or curve which illustrates the count cycle of FIG. 3A.
Figure 3A:
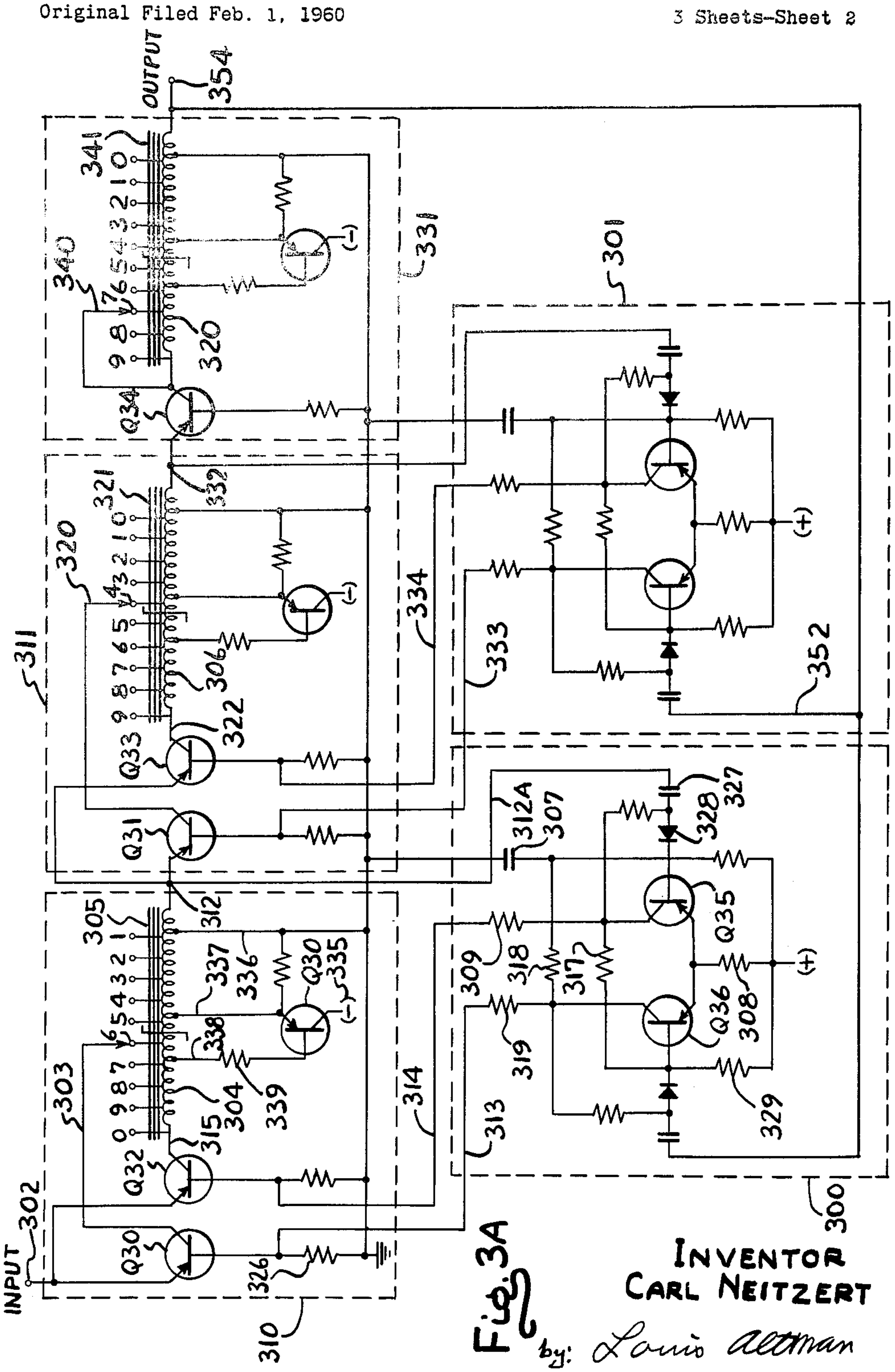
FIG. 3A is a schematic diagram which shows the details of the circuit that completes the blocks shown in FIG. 1.

Turning next to FIG. 3A, there is shown a schematic diagram of a circuit which may be used to complete the blocks of FIG. 1. The major component circuits include transistorized bistable multivibrator circuits 300 and 301 and counters 310, 311, and 331.

For a detailed description of a multivibrator, reference is made to block 300 in FIG. 3A which corresponds to block 10 in FIG. 1, block 301 likewise corresponding to block 11. The device as shown has two stable states which are hereinafter called "state A" and "state B." When in state A, transistor Q35 conducts and transistor Q36 is cut-off. When in state B, transistor Q36 conducts and transistor Q35 is cut-off. Hence multivibrator 300 is a switching device having two output terminals 313 and 314 which may be energized separately, but never simultaneously.

Upon energization of the multivibrator of circuit 300, the charge on capacitor 307 keeps the base of transistor Q35 at ground potential briefly (i.e., less positive than the base of transistor Q36) and current flows from a positive potential terminal (+) through resistance 308, transistor Q35, resistance 309, conductor 314, and resistance 316 to ground. Current flowing through resistance 316 biases the base of transistor Q32 above ground potential to an off condition. Current also flows from transistor Q35 through resistance 317 to bias transistor Q36 to an off condition. The small current which flows in the voltage divider circuit extending from positive battery through resistance 308, the emitter and base of transistor Q35, resistances 318, 319 and 326 to ground does not interfere with the conductivity of transistor Q30.

To switch multivibrator 300 to state B, after a predetermined number of input pulses or signals are received at terminal 302 (corresponding to terminal 9 in FIG. 1), counter 310 produces an output pulse, as will be explained below. Responsive thereto, a pulse is applied through capacitor 327 and diode 328 to the base of transistor Q35 which is made more positive thereby. Transistor Q35 is turned off. A voltage divider including resistances 316, 309, 317 and 329 makes the base of transistor Q36 more negative than the emitter thereof to render transistor Q36 conductive. Thus, in state A, multivibrator 300 applies a blocking potential over conductor 314 to render gating transistor Q32 non-conductive while gating transistor Q30 is conductive. Further, in state B, multivibrator 300 applies a blocking potential to conductor 313, thus rendering gating transistor Q30 nonconductive while removing the blocking potential from conductor 314 to render transistor Q32 conductive.

To reset multivibrator circuit 300, a positive pulse is applied to conductor 353 thereby turning off transistor Q36 by making the base more positive than the emitter thereof. Transistor Q35 turns on thereafter.

In accordance with an aspect of the invention, a single magnetic counter 310 is utilized for performing the functions of the units adjustable counter 12 and the units decade counter 13. Likewise, a single magnetic counter 311 is utilized for performing the functions of the tens adjustable counter 14 and the tens decade counter 15. The windings for counters 310 and 311 are each provided with a select tap and a fixed tap. If a winding is energized via the select tap, an associated core is driven into a given level of magnetic saturation responsive to the receipt of a number of input signals which is preselected by the setting of an associated switch. On the other hand, if the winding is energized via the fixed tap the associated core is driven into the given level of magnetic saturation responsive to the receipt of a fixed number of input signals. Further, as may be seen, counter 331 is provided with only a select tap in the illustrated embodiment. It will be apparent that, if more than three counter stages are provided, all but the last stage will have both a select tap and a fixed tap.

In the exemplary embodiment, the dial or scale of the various switches must be numbered or otherwise indexed to accommodate a difference in the count cycle. For an illustration of this problem, see FIG. 3B. Each time period, indicated by the letter "*t*," includes a pulse when current flows through input terminal 302 (FIG. 3A) and an interval when no current flows. Thus, three time periods *t*1, *t*2, and *t*3 are defined by four pulse periods; hence, a count of four pulses indicates the occurrence of only three time periods so that the count must be reduced by one unit. Further to illustrate the problem, consider the reasons why the years 1900–1999 are known as the Twentieth Century, i.e., twenty "century" years have passed when the year 1901 is reached; thus, the century count must be reduced by one to indicate the number of time periods which have passed.

The magnetic counters illustrated by blocks 12–16 of FIG. 1 include means for applying a magnetic bias thereto. With reference to counter 310, this means is shown as a single winding 304 turned about a toroidal core 305. Preferably winding 304 is a continuous winding having a plurality of taps or terminals which are brought out for external connection. When energized by current flowing in a first direction, the winding forms a circuit for biasing core 305 toward positive magnetic saturation. A selector switch 303 is arranged to connect with any one of the select taps 0–9 to select the number of turns which are energized and thus the number of pulses which are to be counted. When the winding is energized by current flow in a second direction, an output winding is formed by the turns between terminal 312 and conductor 336. A second group of turns which are between conductors 336 and 337 forms a resetting winding, while a third group of turns which are between conductors 337 and 338 forms a control circuit that initiates a resetting cycle.

In greater detail, an application of input signals to the turns between the select tap which is selected by switch 30 and conductor 336 provides a saturation current flow which drives the associated core 305 from a negative to and beyond a positive level of magnetic saturation in a volt-second product corresponding to the integration of a selected number of uniform input pulses (six pulses when switch 303 is set as shown in FIG. 3A).

Figure 2:
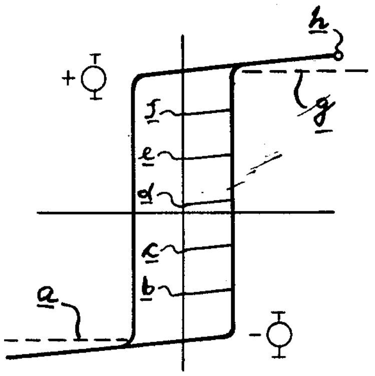
FIG. 2 is a graph showing the hysteresis loop of the cores that are used in connection with the magnetic counters which are shown elsewhere in the drawings.

In operation, the manner in which magnetic counter 310 functions may be understood by making reference to FIG. 2 which shows the hysteresis loop of core 305 that is associated with winding 304. When core 305 is reset to negative magnetic saturation, the magnetc flux is at level "*a*." Assuming that switch 303 connects with the sixth tap of winding 304 as shown in counter 310, the first input pulse or signal which is received at terminal 302 drives the magnetic flux from level "*a*" to point "*b*" as shown in FIG. 2. In a similar manner, each of the next four pulses drives the core flux to points "*c*" to "*f*" respectively. After the receipt of five and a fraction input pulses, the core material is driven into positive magnetic saturation, level "*g*" on the curve of FIG. 2. During the remainder of the sixth pulse occurring after saturation, current flow in winding 304, slightly increases the core flux by a rising magnetic characteristic which is graphically illustrated in FIG. 2 by the curve extending from the level of positive magnetic saturation "*g*" to an extended point "*h*."

To reset the counter at the end of the sixth pulse, the saturation current in winding 304 drops to zero, the core flux decays or drops abruptly from point "*h*" to positive magnetic saturation at level "*g*." The decaying magnetic flux which is so produced induces a negative pulse in the control turns between conductors 337 and 338 which is utilized to trigger a resetting switch in the form of transistor Q37, as will be explained below.

Returning briefly to the counting period, the base electrode of resetting switch Q37 is connected as the control electrode, preferably through a current-limiting and temperature-compensating resistance 339 to conductor 338. During the counting period when saturation or magnetizing current flows through winding 304 to ground, base conductor 338 is more positive than emitter conductor 337 and transistor Q37 is turned off. Thus, the flow of resetting current through the emitter-collector circuit of transistor Q37 is blocked.

The automatic operation of resetting transistor Q37 to start and stop the flow of resetting current follows the saturation current flow during the last of the counted pulses. Stated another way, core 305 is automatically reset each time that the saturation winding is deenergized after the core has been driven to and beyond magnetic saturation. For example, referring to FIG. 2, a voltage of reverse polarity is induced upon termination of the saturating current by the small flux decay as explained above, i.e., magnetic flux falls from point "*h*" to level "*g*" as indicated in FIG. 2. Responsive thereto, emitter conductor 337 momentarily becomes positive with respect to base conductor 338 and transistor Q37 is switched on. Current flows from negative source 335 through transistor Q37 and the resetting turns of winding 304 in a direction which biases the core 305 toward negative magnetic saturation. The circuit values are such that the current flowing through the reset turns between conductors 336 and 337 is sufficient to drive core 305 to negative magnet saturation (level "*a*" in FIG. 2) before an application of the next input pulse or signal.

An output pulse appears at terminal 312 due to the voltage that is induced in the output turns between conductor 336 and terminal 312 by the flux change which occurs as the core 305 is driven from positive to negative magnetic saturation. During the resetting cycle, the voltage induced across the control winding between conductors 337 and 338 makes the base of transistor Q37 negative with respect to the emitter thereof, thus keeping transistor Q37 switched on. However, when core 305 is driven into negative magnetic saturation, the voltage induced across the control winding approaches zero and transistor Q37 turns off, thus ending the flow of resetting current.

For a further description of the basic magnetic counter circuit, reference is made to previously mentioned Patent No. 2,897,380.

A brief description of the operation of the circuit shown in FIG. 3A may be helpful in understanding the present invention. For this purpose, let it be assumed that multivibrators 300 and 301 are in state A so that gating transistors Q30 and Q31 are rendered conductive while gating transistors Q32 and Q33 are rendered non-conductive. Therefore, input signals appearing at terminal 302 are applied through conductive transistor Q30 to a select tap on winding 304 via switch 303. Since switch 303 engages the sixth select tap designated terminal 6, core 305 is driven into and beyond positive magnetic saturation after the receipt of six input signals. Responsive thereto, core 305 is reset to negative magnetic saturation and an output signal is delivered from terminal 312 through transistor Q31 and switch 320 to a select tap on winding 306.

To transfer from an adjustable unit count to a fixed unit count, multivibrator or bistable circuit 300 is tripped when an output pulse is delivered from terminal 312 over conductor **312*a* responsive to the saturation of core 305. The output of multivibrator 300 is now switched from conductor 314 and to conductor 313 thereby blocking gate transistor Q30 and unblocking gate transistor Q32. Since transistor Q32 is conductive, each input signal appearing at terminal 302 is applied to fixed tap 315 on winding 304. Therefore, ten additional input signals are required again to drive core 305** into and beyond the level of positive magnetic saturation.

Tens counter 311 advances one step responsive to the receipt of each ten input signals which appear at terminal 302.

More particularly, an output signal appears at terminal 312 each time that winding 304 receives ten energizing pulses via fixed tap 315. Since select switch 320 engages its fifth terminal designated terminal 4, core 321 is driven to and beyond positive magnetic saturation responsive to the receipt of five input pulses which are transmitted from terminal 312 through transistor Q31. Responsive thereto, multivibrator 301 is tripped, core 321 is reset to negative magnetic saturation, and an output pulse appears at terminal 332 which is transmitted to core 330 through transistor Q34 causing hundreds counter 331 to be advanced one step. The five pulses appearing at terminal 312 represent the receipt of forty-six input pulses at input terminal 302.

Tens counter 311 is switched from an adjustable to a fixed count cycle when multivibrator 301 is tripped (as explained above) to remove a blocking potential from conductor 334 and to apply a blocking potential to conductor 333. Since transistor Q31 is now non-conductive and transistor Q33 is now conductive, all signals appearing at terminal 312 drive core 321 via fixed tap 322. Responsive to each ten pulses appearing at terminal 312, an output pulse appears at terminal 332; or, stated another way, responsive to each hundred input signals received at terminal 302, an output pulse appears at terminal 332.

Adjustable hundreds counter 331 is driven through a count cycle responsive to input signals which continue to appear at terminal 302. That is, every tenth input signal appearing at terminal 302 produces an output signal at terminal 312, and every tenth signal appearing at terminal 312 produces an output signal at terminal 332, thereby energizing hundreds counter winding 330 via transistor Q34. After eight pulses are applied to energize winding 330, core 341 is biased to and beyond magnetic saturation. Responsive thereto, core 341 is reset to negative magnetic saturation, an output signal appears at terminal 351 and multivibrators 300 and 301 are reset to state A via conductors 352 and 353.

Briefly in résumé, the counter circuit of FIG. 3A is made up of units, tens, and hundreds counting stages, each including an adjustable counter with the units and tens stages also including a fixed counter. However, counter stages 310 and 311 produce extra pulses as noted hereinabove with respect to FIG. 3B. To compensate for these extra pulses, the dial markings or other indices associated with switches 320 and 340 are changed to indicate the actual count.

Zero settings in the embodiment of FIG. 3A will be explained next. If units select switch 303 is moved to the one terminal, corresponding to the zero terminals for counters 311 and 331, core 305 is driven into positive magnetic saturation responsive to the receipt of one input signal and a single output pulse occurs at terminal 312 when the input pulse ends. If tens switch 320 is not at its zero setting, the circuit functions as described above when units counter 310 switched from its adjustable to its fixed count. On the other hand, if tens switch 320 is standing on its zero terminal, winding 306 is energized by the single pulse appearing at terminal 312, thereby driving core 321 into and beyond positive magnetic saturation. In a similar manner, if hundreds switch 340 is standing on any terminal other than zero, the circuit functions as described above after completion of the adjustable tens count. However, if switch 340 is standing on its zero terminal, winding 330 is energized by the single pulse that appears at terminal 332 and core 341 is driven into and beyond positive magnetic saturation; therefore, an output pulse appears at terminal 351.

Thus, if counter 310 is set to one and counters 311 and 331 to zero, each counter delivers an output pulse immediately after the receipt of a single input pulse. This is equivalent to the transmission of a single pulse through the entire counter with a delay at each stage which is equal to the width of such pulse. The delay is important to insure proper switching of the multivibrators. For example, let is be assumed that switch 340 is standing on its zero terminal. After tens counter core 321 is driven into and beyond positive magnetic saturation, an output signal appears at tens output terminal 332, the leading edge of which switches multivibrator 301 to state B. Thereafter, hundreds core 341 saturates and an output signal appears at hundreds output terminal 351, the leading edge of which is applied over conductor 352 to switch multivibrator 301 back to state A. The delay or time period between the occurrence of a pulse at tens terminal 332 and a pulse at hundreds terminal 351 allows time enough for all transients to die out. Without the delay period, it is possible that transients resulting from the pulse appearing at tens terminal 332 might switch multivibrator 301 back to state B after the pulse appearing at hundreds terminal 351 has switched it to state A. In fact, it is conceivable that multivibrator 301 might switch back and forth several times while all transients are dying away.

Figure 4:
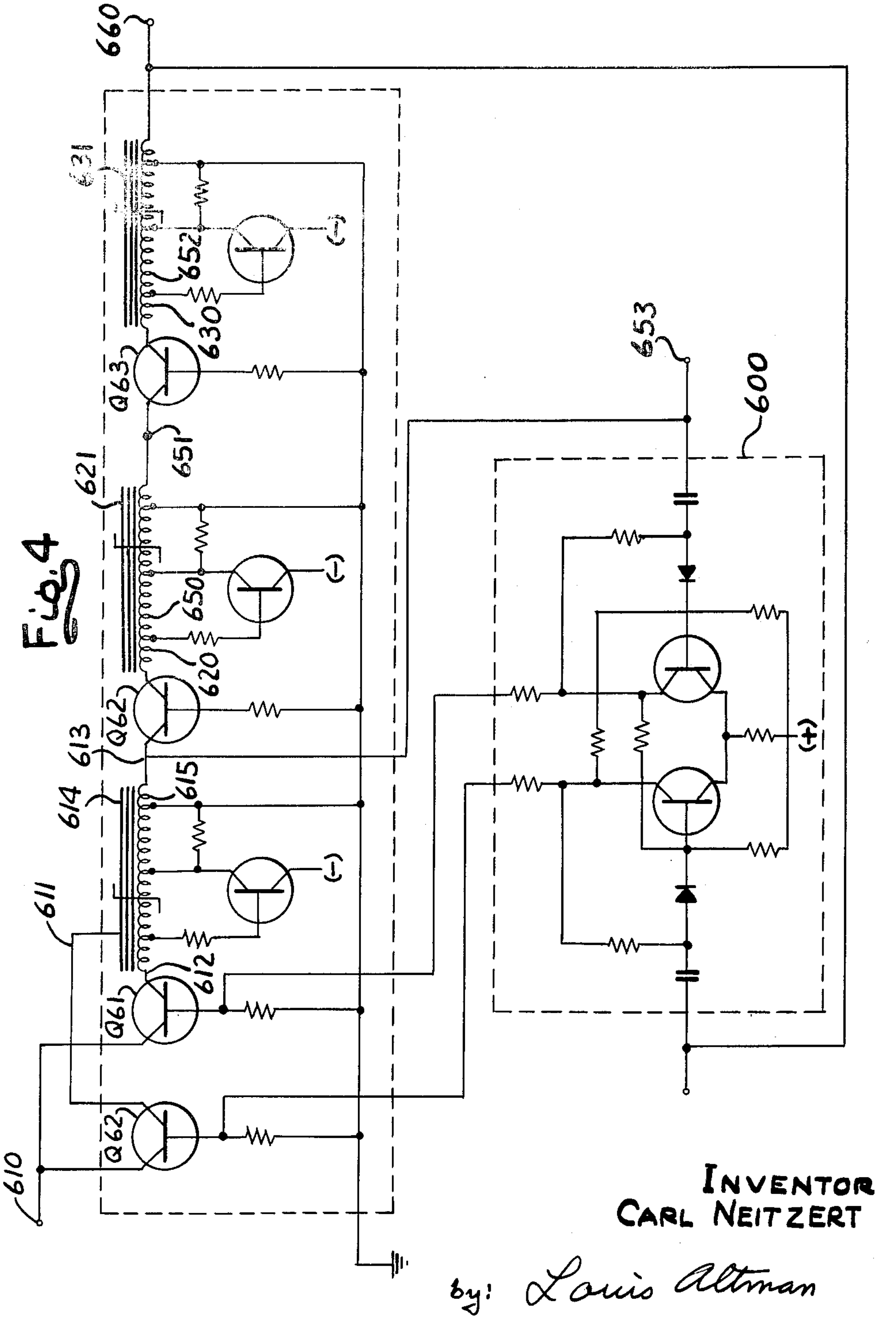
FIG. 4 is a schematic diagram which shows an embodiment that combines the general principles of the invention to provide a simplified circuit.

In accordance with yet another feature of this invention, an adjustable counter may be provided as shown in FIG. 4. From the foregoing description, it will be apparent that, in state A, multivibrator 600 applies a blocking potential to conductor 601 for rendering gating transistor Q61 non-conductive. Further, in state B, multivibrator 600 applies a blocking potential to conductor 602, thus rendering gating transistor Q62 non-conductive while removing the blocking potential from conductor 601 to render transistor Q61 conductive. Thus, input signals appearing at terminal 610 may be applied either through transistor Q62 to a select tap 611 or through transistor Q61 to a fixed tap 612, under the control of multivibrator 600. As will also be apparent from the foregoing description, multivibrator 600 is normally in state A when counting starts and is switched to state B responsive to the magnetic saturation of core 614.

The circuit of FIG. 4 is different from the circuit shown in FIG. 3A because the collector of gating transistor Q62 may be connected to any of the select taps 611, 650, or 652 (or other similar taps if a plurality of taps are provided for each winding) and further because the invention contemplates connecting multivibrator switching terminal 653 to any of the output terminals 613, 651, or 640. In this manner, the circuit of FIG. 4 may be adjusted to count any of many different numbers of input signals before producing an output signal.

More particularly, let it be assumed that each of the magnetic cores in FIG. 4 counts ten input signals when energized through transistors Q61, Q62, or Q63, as the case may be. Further, let it be assumed that core 614 counts three input signals when winding 615 is energized via select tap 611, that core 621 counts four input signals when winding 620 is energized through select tap 650, and further that core 631 counts five input signals when energized via select tap 652. It should also be noted that the actual count of the circuit of FIG. 4 may be less than the number of pulses that are received for reasons which are described above in connection with FIGS. 3A and 3B; however, to simplify the following description, no reference is made to such extra pulses—the references being to the desired count, per se.

With the circuit connected as shown in FIG. 4, an output pulse is produced at terminal 640 after nine hundred and ninety-three input signals have been counted. That is, the first pulses are transmitted through gate transistor Q62 to select terminal 611 and core 614 is saturated on a desired count of three. Responsive thereto, core 614 is reset, multivibrator 600 is switched to state B, and winding 620 is pulsed once. Thereafter, incoming input signals are applied from terminal 610 through transistor Q61 to fixed tap 612. This time core 614 is saturated responsive to a count of ten input signals and winding 620 is pulsed a second time. So far, thirteen input signals have been counted. After eighty additional signals are counted, core 621 is driven into positive magnetic saturation to produce an output pulse at terminal 651. After nine hundred additional signals are counted, core 631 is saturated and an output pulse appears at terminal 640 thus resetting multivibrator 600 and energizing a succeeding circuit.

To change the count of the device that is shown in FIG. 4, switching terminal 653 may be disconnected from terminal 613 and connected either to terminal 651 or to terminal 640. Thus, an initial count may be a multiplication or product count. In a similar manner, the collector of transistor Q62 may be disconnected from select tap 611 and connected either to select tap 650 or to select tap 652, thus causing a different first count. For a specific illustration, consider the count when the collector of transistor Q62 is connected to select tap 650 and switching terminal 653 is connected to terminal 651. The first group of signals appearing at terminal 610 saturates core 621 on a desired count of four, trips multivibrator 600, and pulses winding 630. After a count of nine hundred additional signals which are applied through transistor Q61, an output signal appears at terminal 640. That is, a total of nine hundred and four pulses have been counted. By connecting the collector of transistor Q62 to a proper select tap and the switching terminal 653 to a proper output terminal, any one of a number of counts may be selected. Again, it is noted that the foregoing description of FIG. 4 referes to the actual or desired count and does not refer to the number of input signals that are received.

Quite obviously, counting stages may be added to or eliminated from the device of FIG. 4, or of FIG. 3A, as required.

I claim as my invention:

1. An adjustable high count magnetic counter comprising a plurality of magnetic devices, each having substantially square hysteresis loop characteristics, a multi-turn winding associated with each of said devices for biasing the associated device toward or away from magnetic saturation depending upon the direction of current flow there-through, at least some of said windings having a plurality of taps for selecting the number of input signals which are required to drive said associated device into magnetic saturation, switch means for applying input signals to a selected one of said taps to drive said associated device to and beyond magnetic saturation responsive to the receipt of a preselected number of input signals, and means responsive to the last of said preselected number of input signals for applying said input signals across substantially all of the turns of one of said windings whereby said device functions as a fixed counter.

2. An adjustable, high count, magnetic counter comprising a plurality of magnetic devices, each of said devices having substantially square hysteresis loop characteristics, a multi-turn winding individually associated with each of said devices, each of said windings having at least a fixed tap and a select tap, means responsive to energization of said windings through said fixed taps for driving the devices associated therewith into magnetic saturation responsive to the receipt of a fixed number of input signals, means responsive to energization of said windings through a select tap for driving the device associated therewith into magnetic saturation responsive to the receipt of preselected numbers of said input signals, means responsive to the receipt of a first group of said input signals for applying said input signals to one of said select taps thereby driving the device individually associated therewith from negative magnetic saturation to and beyond positive magnetic saturation responsive to the receipt of a preselected number of input signals, means for resetting said individually associated device to negative magnetic saturation responsive to the last of said preselected number of input signals, means responsive to the receipt of an additional group of said input signals for thereafter applying input signals to one of said fixed taps, and means responsive to the receipt of said fixed number of input signals for transmitting an output signal from said counter.

3. An adjustable, high count, multi-stage, magnetic counter comprising a plurality of magnetic devices, each having substantially square hysteresis loop characteristics, a multi-turn winding on each of said magnetic devices, at least some of said windings having a plurality of taps for selecting a number of said turns, thereby preselecting the number of input signals which are required to drive an associated one of said magnetic devices into magnetic saturation, an input terminal associated with each of said stages, two electronic devices associated with at least some of said stages, means for connecting a first of said electronic devices between said input terminal and a select tap on one of said windings, means for connecting a second of said electronic devices between said input terminal and a fixed tap on one of said windings, switching means comprising a bi-stable electronic circuit associated with each of said stages, means for rendering either of said electronic devices conductive and the other of said electronic devices non-conductive depending upon which stable state said bi-stable circuit is in, means responsive to the receipt of first of said input signals for energizing one of said windings via said first electronic devices, thereby counting said preselected number of input signals, means responsive to said last named means for switching said bi-stable circuit thereby rendering said second electronic device conductive, and means responsive to the receipt of another of said input signals for energizing the winding associated with said second electronic device, thereby counting a fixed number of said input signals.

4. An adjustable, high count magnetic counter comprising a plurality of stages, each of said stages comprising a core having substantially square hysteresis loop characteristics and rising magnetic characteristics extending beyond loop saturation level, a winding having at least a fixed and a select tap associated with each of said cores, means for repeatedly energizing a particular winding associated with one of said stages via said select tap until the core associated therewith is driven from a first to and beyond a second level of magnetic saturation, means thereafter responsive to decaying magnetic flux in said associated core for resetting said associated core to said first level of magnetic saturation, means responsive to the resetting of the core for repeatedly energizing said particular winding via said fixed tap until the core is again driven beyond the second level of magnetic saturation, and means responsive to said last named means for transmitting an output signal from said one stage.

5. An adjustable, high count magnetic circuit comprising at least one core having substantially square hysteresis loop characteristics and rising magnetic characteristics extending beyond loop saturation level, means comprising a multi-tap winding associated with said core, means responsive to a first train of pulses for energizing said winding through a selected one of said taps for driving said core from a first to and beyond a second level of magnetic saturation, means thereafter responsive to decaying magnetic flux in said core for resetting said core to said first level of magnetic saturation, and means responsive to said last named means for applying a second train of pulses to a fixed tap on said winding for producing an output signal.

6. An adjustable high count magnetic counter having an input terminal to which input pulses are applied and having an output terminal, which comprises a saturable magnetic core member having a substantially rectangular hysteresis loop characteristic, a multi-turn winding electromagnetically associated with said core member, said core member being driven from a first state of saturation to a second state of saturation in response to the application of input pulses to the winding, a plurality of selector taps on said winding for selecting the number of input pulses which must be applied thereto to drive said core member to the second state of saturation, a fixed tap on said winding to which a fixed number of input pulses must be applied to drive said core member to the second state of saturation, means responsive to the second state of saturation being attained for resetting said core member to the first state, and switch means for initially connecting the input terminal only to a selected selector tap so that input pulses are applied thereto and responsive to the core member being saturated by input pulses applied to the selected selector tap for connecting the input terminal only to said fixed tap so that input pulses are applied thereto.

7. An adjustable high count magnetic counter having an input terminal to which input pulses are applied and an output terminal, which comprises a saturable magnetic core member heaving a substantially rectangular hysteresis loop characteristic, a multi-turn winding associated with said core member, said winding having a fixed tap and a plurality of selector taps, a first input gate associated with the input terminal, means for associating a selected selector tap with said first input gate so that the transmission of input pulses to the selector tap is controlled by said gate, a second input gate associated with the input terminal and with the fixed tap for controlling the transmission of input pulses thereto, means responsive to the application of a fixed number of input pulses to said fixed tap for causing said core member to be driven from a first state of saturation to a second state of saturation, means responsive to the application of a selected number of input pulses to a selector tap for causing said core member to be driven from the first state of saturation to the second state of saturation, means responsive to the second state of saturation being attained for resetting said core member to the first state, and switch means for selectively opening said input gate so that initially said first input gate is opened whereas said second input gate is closed and, responsive to the core member being saturated by input pulses applied to the selected selector tap for opening said second input gate and closing said first input gate.

8. An adjustable high count composite magnetic counter, which comprises a plurality of counter stages each including a magnetic core member and each having an input terminal to which input pulses are applied and an output terminal, each core member having a substantially rectangular hysteresis loop characteristic and having a multi-turn winding independently associated therewith, each of said windings having a plurality of selector taps, each of said windings except the winding in the last stage having a fixed tap, the output terminal of each stage being connected to the input terminal of the next succeeding stage, means responsive to energization of said windings through said fixed taps for driving the associated core members from first states of saturation to second states in response to the receipt of fixed numbers of input pulses, means responsive to energization of said windings through selected ones of the selector taps for driving the associated core members from the first states of saturation to the second states in response to the receipt of selected numbers of input pulses, and switch means associated with the input terminal of each stage except the last stage for selectively controlling the transmission of input pulses to the fixed tap and the selected selector tap in each stage so that said associated winding is energized thereby.

9. An adjustable high count composite magnetic counter, which comprises a plurality of counter stages each including a magnetic core member and each having an input terminal to which input pulses are applied and an output terminal, each magnetic core member having a substantially rectangular hysteresis loop characteristic and having a multi-turn winding independently associated therewith, each of said windings having a fixed tap connected to the input terminal and at least one of said windings having at least one selector tap, means responsive to energization of said windings through said fixed taps for driving the associated core members from first states of saturation to second states in response to the receipt of fixed numbers of input pulses, means responsive to energization of said windings through selector taps for driving the associated core members from the first states of saturation to the second states in response to the receipt of selected numbers of input pulses, an output pulse being produced by each stage at the output thereof when the associated core attains the second state of saturation, means associated with each stage and responsive to the second state of saturation being attained therein for resetting the associated core member to the first state, the output terminal of each stage being connected to the input terminal of the next succeeding stage, and switch means for selectively controlling the transmission of input pulses to the composite counter so that initially the input pulses are applied to a selector tap in a selected stage causing the associated winding to be energized thereby and, in response to the selected stage counter being driven into the second state of saturation, the input pulses are subsequently applied to said fixed tap of the first stage causing the associated winding to be energized, said windings in the succeeding stages being energized by output pulses from the preceding stages.

10. An adjustable high count magnetic counter having an input terminal to which input pulses are applied and an output terminal, which comprises a saturable magnetic core member having a winding wound thereon, said core member being driven from a first state of saturation to a second state of saturation in response to the application of input pulses to the winding, a plurality of selector taps on the winding for selecting the number of input pulses which must be applied thereto to drive said core member to the second state of saturation, a fixed tap on the winding to which a fixed number of input pulses must be applied to drive said core member to the second state of saturation, switch means for selectively connecting the input terminal to a selected selector tap and the fixed tap, resetting means responsive to the second state of saturation being attained for resetting the core to the first state of saturation and transfer means responsive to the second state of saturation being attained for a actuating said switch means to transfer said input terminal from a selected selector tap to said fixed tap.

References Cited by the Examiner

UNITED STATES PATENTS

| | | | |
|---|---|---|---|
| 2,757,297 | 7/1956 | Evans et al. | 307—88 |
| 2,808,578 | 10/1957 | Goodell et al. | 235—92 |
| 2,824,698 | 2/1958 | Van Nice et al. | 235—92 |
| 2,897,380 | 7/1959 | Neitzert | 235—92 |
| 3,075,084 | 1/1963 | De Miranda et al. | 307—88 |

OTHER REFERENCES

Pages 859–869, Oct. 3–5, 1955, A Predetermined Scaler Utilizing Transistors and Magnetic Cores, by Van Nice et al., from Proc. of the National Electronics Conf.

MALCOLM A. MORRISON, *Primary Examiner.*

J. F. MILLER, *Assistant Examiner.*